(12) United States Patent
Hobbet et al.

(10) Patent No.: US 8,161,237 B2
(45) Date of Patent: Apr. 17, 2012

(54) ASYMMETRIC LOAD BALANCING FOR RAID STORAGE SYSTEMS

(75) Inventors: Jeffrey R. Hobbet, Holly Springs, NC (US); Donald R. Frame, Apex, NC (US); Daryl Cromer, Cary, NC (US); Michael S. Mettler, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 356 days.

(21) Appl. No.: 12/412,495

(22) Filed: Mar. 27, 2009

(65) Prior Publication Data

US 2010/0250846 A1 Sep. 30, 2010

(51) Int. Cl.
G06F 12/00 (2006.01)
G06F 12/16 (2006.01)

(52) U.S. Cl. ......... 711/114; 711/E12.001; 711/E12.103; 710/301

(58) Field of Classification Search .................. 711/114, 711/E12.001, E12.103; 710/301
See application file for complete search history.

(56) References Cited

U.S. PATENT DOCUMENTS

| | | | | |
|---|---|---|---|---|
| 6,591,339 | B1 * | 7/2003 | Horst et al. | 711/114 |
| 2009/0204758 | A1 * | 8/2009 | Luning | 711/114 |
| 2010/0153640 | A1 * | 6/2010 | Jagadish et al. | 711/114 |

* cited by examiner

Primary Examiner — Yong Choe
(74) Attorney, Agent, or Firm — Ference & Associates LLC

(57) ABSTRACT

The instant invention broadly contemplates balancing of asymmetric RAID arrays based on application usage patterns. The instantly claimed invention broadly contemplates balancing the type of workload and delivery of the work load in asymmetric RAID arrays by intelligently implementing different types of applications on disks strategically positioned to deliver workload to the RAID channel that is most capable of handling the work load. The invention makes use of the fact that some applications are more large block, sequential transfer dependant while other applications are more small block, high random, high IOP dependent, and places these applications accordingly within the asymmetric RAID array.

17 Claims, 3 Drawing Sheets

ASYMMETRIC LOAD BALANCING FOR RAID STORAGE SYSTEMS

FIELD OF THE INVENTION

This invention relates to RAID (Redundant Array of Independent Disks) storage system configurations and maximizing workload delivery in asymmetric RAID configurations.

BACKGROUND OF THE INVENTION

RAID is a technology that employs the simultaneous use of two or more hard disk drives to achieve greater levels of performance, reliability, and/or larger data volume sizes. RAID is now used as an umbrella term for computer data storage schemes that can divide and replicate data among hard disk drives. Various designs involve the design goals of increased data reliability and increased input/output performance. When several physical disks are set up to use RAID, they are said to be in a RAID array. The RAID array distributes data across several disks, but the user and operating system see the array as one single disk. RAID can be configured in various ways to serve different purposes.

Many RAID arrays, due to budget limitations and/or hardware limitations, are configured asymmetrically (i.e. have a different number of disks feeding the RAID card channels). This can lead to an imbalance in the underlying RAID configuration and an inability to fully service the RAID card channel(s) under a given I/O load. The only currently known solution is to leave the RAID array unbalanced or to purchase additional hardware.

Accordingly, a need has arisen to provide proper load balancing to maximize asymmetric RAID configurations.

SUMMARY OF THE INVENTION

At least one presently preferred embodiment of the present invention broadly contemplates balancing of an asymmetric RAID array based on application usage patterns by reserving more HDDs for a first application type in order to properly supply workload. The first application type can be for example high random, small block transfer dependent applications. The invention balances the RAID array across the two RAID channels of a two-channel RAID card by intelligently placing applications, sorted by type, on disks feeding the two RAID channels in an attempt to fully utilize each of the two pipes into the RAID card.

The present invention takes advantage of the fact that some applications more easily fill their RAID channel. For example, large block, sequential transfer dependant applications easily supply enough work load, even when less of these applications are implemented on fewer disks. In contrast, other applications are more small block, high random transfer dependent, and cannot as easily fill the RAID channel.

According to an embodiment of the present invention, the large block, sequential transfer dependent applications are put onto the "lighter" RAID channel (the channel having fewer disks piped to it) in order to maximize the underlying RAID's capability to meet the demand. Examples of these large block, sequential transfer dependant applications would be the I/O itself and video streaming. Other applications that require small block, random, high IOP demand would then be fed to the "heavier" RAID channel (i.e. the one having more disks piped to it) that is more capable of servicing this demand. Examples of these small block, high random applications include email servers and databases. Thus, the instantly claimed invention broadly contemplates balancing the type of workload and delivery of the workload in RAID arrays by intelligently implementing different types of applications on disks strategically positioned to deliver the workload to the RAID channel that is most capable of handling the workload.

In summary, one aspect of the invention provides a system comprising: at least one processor; an asymmetric RAID operatively connected to the at least one processor, the asymmetric RAID comprising: at least one RAID card; and a heavy side of the asymmetric RAID having a first set of storage devices reserved for a first application type.

Another aspect of the invention provides a method comprising: reserving a heavy side of an asymmetric RAID having a first set of storage devices for a first application type; and implementing the first application type on the first set of storage devices.

Another aspect of the invention provides a program storage device readable by machine, tangibly embodying a program of instructions that when executed by a processor of the machine enable the machine to: reserve a heavy side of an asymmetric RAID having a first set of storage devices for a first application type; and implement the first application type on the first set of storage devices.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
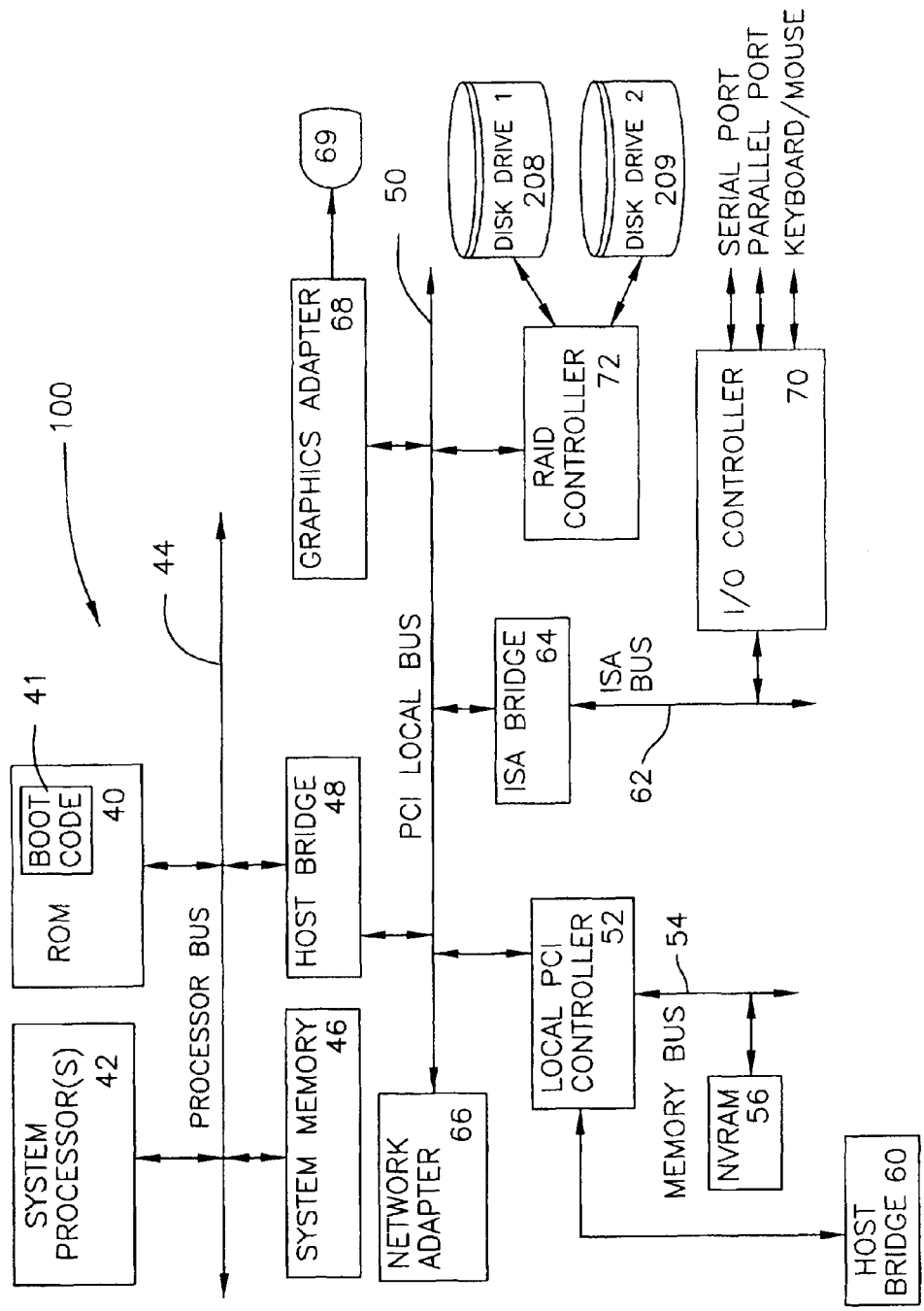
FIG. 1 is a block diagram of an illustrative embodiment of a computer system.

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of devices, systems, processes, etc. that are consistent with the invention as claimed herein.

The following description begins with a general overview of the instant invention. The description will then turn to a more detailed description of preferred embodiments of the instant invention with reference to the accompanying drawings.

As briefly discussed above, many RAID arrays, due to budget limitations and/or hardware limitations, are configured asymmetrically (i.e. they are unbalanced). This imbalance in the underlying RAID configuration can lead to an inability to fully service the RAID card channel(s) under given I/O loads. As a non-limiting example, in RAID cards that have only 2 channels and backplane limitations, a 12-drive array can be configured with 8 drives in one channel and 4 drives in the other channel. This is because the RAID cards themselves can handle only a certain number of drives per RAID card. That is, the RAID array is unbalanced in the sense that 8 drives feed/are piped to one channel, while four drives feed/are piped the second channel. This type of unbalanced scenario is frequently encountered in large RAID arrays.

Such an asymmetric RAID array can encounter problems when applications that place varying levels of demand (e.g. different amounts of workload piped to the RAID channel) are not implemented on the storage devices with load balancing in mind. As a non-limiting example, applications using small block, highly random transfers requiring high IOP (input/output operations per second) counts are sometimes implemented on the "lighter" side (e.g. the 4-disk side in this example) of the RAID array. This leads to a scenario whereby the 4-disk side of the RAID array will not be able to fill its pipe/channel to the RAID card efficiently due to the randomness of application work load delivery.

Thus, at least one embodiment of the invention broadly contemplates load balancing in asymmetric RAID arrays by reserving more HDDs for applications of a first type that do not easily fill the RAID channel (e.g. high random, small block transfer dependent applications). This implementation is of general applicability. That is, the underlying RAID function does not matter for the purposes of this invention (e.g. mirrored or striped disks), rather the invention focuses on the number of drives attached to the RAID card(s) and appropriate balancing of load based on an application type parameter. In other words, due to hardware limitations or other practical limitations, asymmetric RAID arrays are utilized frequently and unbalance in the system results, leading to inefficiency. The instant invention maximizes load balancing for the particular situation encountered in an asymmetric RAID array. Thus, the invention broadly contemplates maximizing load balance for the underlying asymmetric RAID array by intelligently placing applications within the system.

Therefore, in accordance with at least one presently preferred embodiment of the invention are apparatuses, systems, and methods to appropriately manage asymmetric RAID configurations that arise simply because of limited number of hardware bays to plug drives into. Knowing the hardware and what is underneath it, the instant invention implements a tuned system in such a way that maximizes the bandwidth of the RAID card(s). That is, the RAID card is provided with the most appropriate feeds given the available channels, the number of disks and their associated applications feeding those channels. This is accomplished for example by implementing applications that require small block, high random transfers with high IOP counts on the "heavier side" of the RAID array (i.e. more disks are reserved for this type of application). In other words, the heavier side of the RAID array is reserved for this application type. It should also be noted that if the RAID array is reconfigured, appropriate re-tuning might again be necessary to ensure the most appropriate balancing.

Referring now to the figures, at least one presently preferred embodiment of the invention will be described.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard and mouse. In addition, I/O controller 70 supports external communication by computer system 100 via serial and parallel ports. A RAID controller (card) 72 is in communication with disk drives 208, 209, forming a RAID array, which can take a variety of forms and will be further described in connection with a specific, non-limiting example in FIG. 2.

Figure 2:
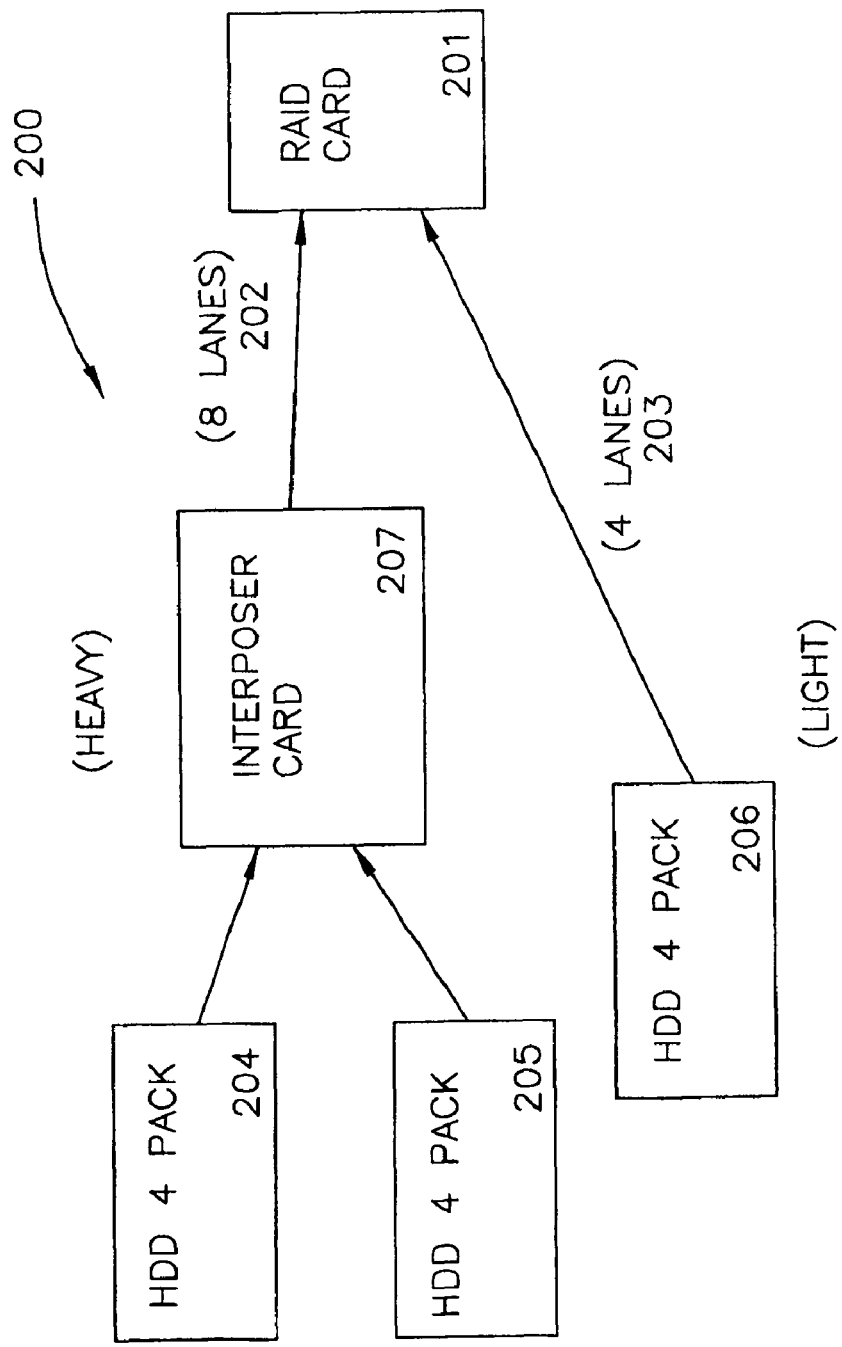
FIG. 2 is a block diagram of an illustrative embodiment of an asymmetric RAID.

As a specific and non-limiting example of load balancing according to at least one embodiment of the instant invention and referring to FIG. 2, a twelve-lane RAID array 200 is shown. Eight lanes are on one pipe 202 (i.e. two four pack HDDs (204, 205) going into an interposer card 207, piped to the RAID card 201 and four lanes (one four pack HDD 206 piped to the RAID card 201) are on the other pipe 203. Given this particular configuration, the difficulty is to maximize the available bandwidth. For example, consider the pipe 202 that goes from the interposer card 207 to the RAID card 201. The RAID card 201 can only handle a certain through put from this pipe 202, no matter what or how many drives (e.g. 204, 205) feed it. The situation to be avoided is to have one pipe open while the other pipe is overloaded. Thus, the invention implements smart load balancing when such an asymmetric scenario is encountered by strategically implementing different applications (providing differing workload feeds) onto different HDDs within the array, given the particular asymmetric RAID array encountered (in this case, 12 lanes and two channels).

Accordingly, one embodiment of the instant invention utilizes HDDs 204, 205 on the interposer card side of the RAID array 200 (with eight drives behind it as shown in FIG. 2) to drive a higher amount of random work through that pipe 202. This is accomplished by strategically placing applications (e.g. mail server(s)) requiring small block, random, or high IOP on the HDDs 204, 205 behind the interposer card 207. These applications are placed behind the interposer card 207 (with 8 drives behind it) because this drives more workload in a random sense to the pipeline 202 of the RAID card 201 than if these applications were implemented on the four pack HDD 206 located on the other side of the array. Accordingly, the other pipe 203 (with the four pack HDD 206, as shown in FIG. 2) is utilized to support applications that fill the pipe (203) quickly (e.g. large block, sequential transfer dependant applications such as video server(s)).

Thus, this exemplary implementation ensures that the RAID array 200 does not have one RAID channel waiting for data to come to it while another is overloaded by placing more applications supporting random work to a particular pipe (e.g. 202) (heavy channel) and placing fewer drives supporting large block, sequential transfers to the other pipe (e.g. 203) (light channel). Thus, this implementation arrangement maximizes the workload to the particular RAID array 200 being employed by ensuring that the available bandwidth to the RAID card 201 is utilized in an efficient manner.

Figure 3:
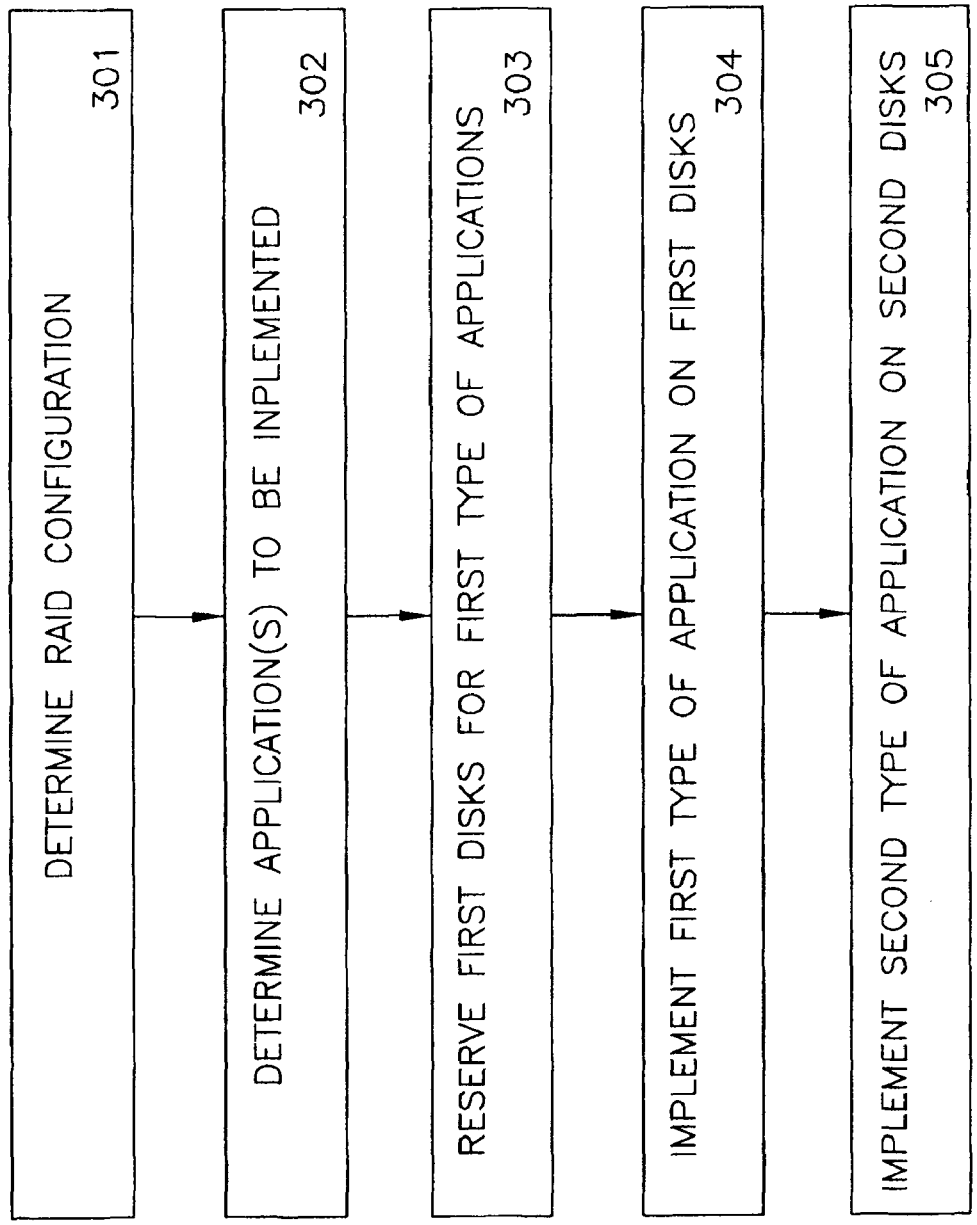
FIG. 3 is a flow chart of configuring an asymmetric RAID for maximum workload balancing based on application type.

Referring now to FIG. 3, a non-limiting example of configuring an asymmetric RAID array will be described. In order to configure the RAID storage system properly, certain information will have to be gathered and analyzed. The system must know the particular RAID configuration (i.e. the hardware configuration). Accordingly, the system will first determine the configuration of the underlying RAID array 301. The RAID configuration information will generally be available to the system (e.g. this information can be made automatically available to the system itself—e.g. detecting the presence of an interposer card supporting a number of disk drives behind it) but could also be input by a technician. The system also has to know what applications (and the type of application it is regarding the type of workload produced and delivered) are to be installed in order to place these applications on the available disks most appropriately. Accordingly, the system will determine which types of applications are to be implemented 302. For example, the system will determine whether an e-mail server and/or video server is to be implemented, as these would be placed onto HDDs feeding different channels. In accordance with the above description, the system reserves a first set of disks (e.g. 8 pack HDD) for a first type of application (e.g. those producing large amounts of random workload) 303. These applications are implemented on these reserved disks 304. The system will then implement large block, sequential transfer dependent applications on the second set of disks, 305.

As can be seen from the above examples, the underlying drives having applications that are going to be more stressful to the RAID (i.e. put out more data on their lines) are placed on a pipe supporting less drives, as these applications will easily fill the available pipe, even in reduced numbers. Those drives having applications supporting more random work and that are not going to be able to fill the pipe up under some circumstances are placed on a pipe supporting more drives and thus more of this type of application and associated workload. Thus, with eight drives (204, 205) behind the interposer card (e.g. as in FIG. 2) supporting applications with random work, the system now has eight spindles working underneath and it is going to fill the pipe much more readily, given the workload environment.

To briefly recap, the instantly claimed invention broadly contemplates smart load balancing in an asymmetric RAID array by utilizing knowledge of what the HDDs are on particular pipes and appropriately implementing applications on those HDDs, reserving more HDDs for applications that do not easily fill the RAID channel. This maximizes the systems efficiency by effectively making a bottleneck, if any, at the RAID card input rather than the drive(s) output(s).

It should be understood that many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

Embodiments of the invention may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. A system comprising:
at least one processor;
an asymmetric RAID operatively connected to the at least one processor, the asymmetric RAID comprising:
at least one RAID card; and
a heavy side of the asymmetric RAID having a first set of storage devices reserved for a first application type;
wherein the asymmetric RAID further comprises:
a light side of the asymmetric RAID having a second set of storage devices reserved for a second application type, wherein said second set of storage devices comprise a same type of storage device as used for said first set of storage devices, and wherein said second set of storage devices are fewer in number than said first set of storage devices.

2. The system according to claim 1, wherein:
the second application type comprises large block, sequential transfer dependent applications;
the first application type comprises small block, high random transfer dependent applications; and
the first set and second set of storage devices comprise hard disk drives.

3. The system according to claim 1, wherein the asymmetric RAID array further comprises an interposer card, the interposer card being configured to connect one or more of the first set and second set of storage devices and the at least one RAID card.

4. The system according to claim 1, wherein:
the at least one RAID card comprises two RAID channels;
the first set of storage devices utilize a first one of the two RAID channels; and
the second set of storage devices utilize a second one of the two RAID channels.

5. The system according to claim 1, wherein the first set and second set of storage devices have the first and second application types implemented thereon to maximize application workload balancing.

6. The system according to claim 1, wherein:
the first set of storage devices comprises an email server; and
the second set of storage devices comprises a video server.

7. The system according to claim 1, wherein:
the first set of storage devices comprises two hard disk drive 4 packs; and
the second set of storage devices comprises one hard disk drive 4 pack.

8. A method comprising:
reserving a heavy side of an asymmetric RAID having a first set of storage devices for a first application type; and
implementing the first application type on the first set of storage devices;
further comprising:
reserving a light side of the asymmetric RAID having a second set of storage devices for a second application type; and
implementing the second application type on the second set of storage devices, wherein said second set of storage devices comprise a same type of storage device as used for said first set of storage devices, and wherein said second set of storage devices are fewer in number than said first set of storage devices.

9. The method according to claim 8, wherein:
the second application type comprises large block, sequential transfer dependent applications;
the first application type comprises small block, high random transfer dependent applications; and
the first set and second set of storage devices comprise hard disk drives.

10. The method according to claim 8, further comprising providing an interposer card, wherein the interposer card connects one or more of the first set and second set of storage devices to at least one RAID card.

11. The method according to claim 10, wherein:
the at least one RAID card comprises two RAID channels;
the first set of storage devices utilize a first one of the two RAID channels; and
the second set of storage devices utilize a second one of the two RAID channels.

12. The method according to claim 8, wherein the first set and second set of storage devices having the first and second application types implemented thereon maximize application workload balancing.

13. The method according to claim 8, wherein:
the first set of storage devices comprises an email server; and
the second set of storage devices comprises a video server.

14. The method according to claim 8, wherein:
the first set of storage devices comprises two hard disk drive 4 packs; and
the second set of storage devices comprises one hard disk drive 4 pack.

15. A program storage device readable by machine, tangibly embodying a program of instructions that when executed by a processor of the machine enable the machine to:
reserve a heavy side of an asymmetric RAID having a first set of storage devices for a first application type; and
implement the first application type on the first set of storage devices;
wherein the program of instructions further enable the machine to:
reserve a light side of the asymmetric RAID having a second set of storage devices for a second application type, the second application type comprising large block, sequential transfer dependent applications; and
implement the second application type on the second set of storage devices, wherein said second set of storage devices comprise a same type of storage device as used for said first set of storage devices, and wherein said second set of storage devices are fewer in number than said first set of storage devices.

16. The program storage device according to claim 15, wherein:
the first application type comprises small block, high random transfer dependent applications; and
the first set and second set of storage devices comprise hard disk drives.

17. The program storage device according to claim 15, wherein:
the first set of storage devices comprises two hard disk drive 4 packs; and
the second set of storage devices comprises one hard disk drive 4 pack.

* * * * *